US005584050A

United States Patent [19]

Lyons

[11] Patent Number: 5,584,050

[45] Date of Patent: Dec. 10, 1996

[54] PROGRAM MONITORING SYSTEM

[75] Inventor: Michael A. Lyons, Whitby, Canada

[73] Assignee: A.C. Nielsen Company, Northbrook, Ill.

[21] Appl. No.: 319,929

[22] Filed: Oct. 7, 1994

[30] Foreign Application Priority Data

Mar. 25, 1994 [CA] Canada .................................. 2119970

[51] Int. Cl.$^{6}$ .................................................. H04B 17/00

[52] U.S. Cl. .................................. 455/67.1; 455/2; 348/1

[58] Field of Search .............................. 455/2, 3.1, 56.1, 455/67.1, 115, 6.1, 6.2; 348/1–5, 7, 10

[56] References Cited

U.S. PATENT DOCUMENTS

| | | | |
|---|---|---|---|
| 4,230,990 | 10/1980 | Lert, Jr. et al. | 348/4 X |
| 5,019,899 | 5/1991 | Boles et al. | 348/1 X |
| 5,081,680 | 1/1992 | Bennett | 455/2 X |
| 5,162,905 | 11/1992 | Itoh et al. | 348/4 X |
| 5,425,100 | 6/1995 | Thomas et al. | 455/2 |
| 5,450,122 | 9/1995 | Keene | 455/2 |

*Primary Examiner*—Chi H. Pham

*Attorney, Agent, or Firm*—Marshall, O'Toole, Gerstein, Murray & Borun

[57] ABSTRACT

A program monitoring system which monitors programs aired by a plurality of broadcast stations includes a plurality of the broadcast stations. Each broadcast station transmits to a central station program information concerning programs aired by the broadcast stations. The program information includes identification information for each of the programs, and information relating to a cost of airing each of the programs. The identification information concerning the programs may be different between broadcast stations. The central station receives the program information and determines therefrom identities of the programs aired by the broadcast stations and the cost of airing these programs.

30 Claims, 4 Drawing Sheets

| CROSS - CODE TABLE | | | | |
|---|---|---|---|---|
| COMMERCIAL DESCRIPTION | COMPANY/ ADVERTISER CODE | CONTRACT INVOICE NUMBER | TAPE CARTRIDGE # | UNIVERSAL CODE (S) (UP TO FIVE) |
| ABC | 0969 | 1219 | 958 | 807555 |
| ABC/3546Z | 82 | 13938 | – | 807555 |

70

FIGURE 3

PROGRAM MONITORING SYSTEM

TECHNICAL FIELD OF THE INVENTION

The present invention relates generally to a system for monitoring programs and, more particularly, to a system for determining the identities of, and the costs associated with, programs aired by broadcast stations.

BACKGROUND OF THE INVENTION

While the present invention is useful in monitoring any type of program, such as regular programs, commercials, public service announcements, and the like, it is particularly well suited for the monitoring of commercials. Therefore, the present invention is described herein in the context of commercial monitoring. However, it should be kept in mind that the present invention can be used to monitor any type of program.

Commercials, which are aired by television and/or radio broadcast stations, are currently monitored by existing commercial monitoring systems in order to assemble competitive program information relating to those commercials. Such competitive program information typically includes at least the identities of each aired commercial, the times at which each commercial was aired, the duration of each commercial as aired, and the channel over which each commercial was aired.

Competitive program information may be useful to advertisers who wish to determine that their commercials were actually aired at the times, and for the durations, purchased by the advertisers. This information may also be important to network broadcasters to determine that their local affiliates have aired the national or regional commercials of the network broadcasters, and that such commercials were not replaced with local commercials by the local affiliates. Furthermore, performers who perform in commercials may find competitive program information important in order to identify the level of compensation to which they are entitled.

Competitive program information is often combined with cost and brand information. From this combination of information, competitive advertising reports may be assembled from which advertisers, advertising agencies, and the like, may determine such useful competitive information as the advertising revenues expended by advertiser and/or by brand, the advertising strategies implemented by advertisers for their brands, and the like.

One methodology employed by current commercial monitoring systems in order to assemble competitive program information involves the use of identification codes which are embedded in the commercials to be monitored. Broadcasts are then monitored for such embedded identification codes and, if any of the embedded identification codes are detected, information about the commercials in which the identification codes are embedded are stored for later transmission to a central facility. Another methodology employed by current commercial monitoring systems in order to assemble competitive program information involves the use of a reference pattern which is stored in a reference file for each commercial to be monitored. Broad-cast patterns are then extracted from broadcasts, and the extracted broadcast patterns are compared to the stored reference patterns. A match between an extracted broadcast pattern and a stored reference pattern indicates that one of the commercials to be monitored was aired. Information about that commercial is then stored for later transmission to a central facility.

Commercial monitoring systems relying on embedded identification codes are limited by the fact that not all commercials carry a commercial identification code embedded therein. Commercial monitoring systems relying on pattern recognition are limited by the number of reference patterns which may be effectively and economically stored and processed by the pattern matching computer. That is, the accuracy of commercial recognition is a function of the accuracy of the match between the extracted broadcast patterns and the stored reference patterns; the accuracy of the match between the extracted broadcast patterns and the stored reference patterns is a function of the uniqueness of these patterns; and, the uniqueness of these patterns is typically a function of the size of these patterns.

Moreover, in both types of commercial monitoring systems, the commercial monitoring equipment, which is chosen to receive the broadcast signals from all monitored broadcast stations, is usually located at a single monitoring site. The selection of this single monitoring site is often critical because the broadcast signals from all monitored broadcast stations must have sufficient signal strength at the single monitoring site that either the embedded identification codes can be accurately detected or the extracted broadcast patterns can be accurately extracted. Since it is often difficult to find a single monitoring site where the broadcast signals from all of the monitored broadcast stations are received with sufficient signal strength to permit accurate identification of the commercials aired by all of the monitored broadcast stations in the monitored area, more than one monitoring site is often required.

Furthermore, since the cost of airing commercials is not broadcast by broadcasters, commercial monitoring equipment cannot automatically receive and process this cost information. Therefore, if competitive program information is to be correlated with cost and brand information in order to assemble competitive advertising reports, cost information must be manually acquired and entered so that such competitive advertising reports may be generated.

Because of the time required to acquire cost information, and because the cost of airing commercials may fluctuate between the time that the cost information is acquired, the time that the cost information is entered, and the time that the competitive advertising reports are generated, cost information is often stale by the time that competitive advertising reports are delivered to the end users. Accordingly, providing accurate competitive advertising reports is both difficult and time consuming.

The present invention solves one or more of the above described problems.

SUMMARY OF THE INVENTION

In one aspect of the present invention, a program monitoring system for monitoring programs aired by a broadcast station includes a first processing means located at the broadcast station for processing program information concerning the programs aired by the broadcast station. The program information includes information relating to a cost of airing each of the programs. A transmitting means is located at the broadcast station, and is connected to the first processing means. The transmitting means transmits the program information. A receiving means is located remotely from the broadcast station, and receives the program information transmitted by the transmitting means. A second processing means, which is connected to the receiving means, processes the program information in order to identify the programs from the program information and in order to determine, from the program information, the cost of the programs aired by the broadcast station. A communication link links the transmitting means and the receiving means.

In another aspect of the present invention, a system includes a memory located at a broadcast station. The memory stores program information concerning programs aired by the broadcast station. A transmitter is located at the broadcast station and is connected to the memory. The transmitter is arranged to transmit the program information. A receiver is located remotely from the broadcast station, and is arranged to receive the program information transmitted by the transmitter. A processor is connected to the receiver, and is arranged to determine, from the program information, the identity of the programs aired by the broadcast stations and the cost of airing the programs aired by the broadcast station.

In yet another aspect of the present invention, an apparatus for monitoring programs aired by a plurality of broadcast stations includes a receiving means which is located remotely from the broadcast stations and which receives program information from the broadcast stations. The program information includes identification information from which the identity of the programs aired by the broadcast stations may be determined. The program information also includes cost information relating to a cost of airing each of the programs. The identification information may be different between broadcast stations. A processing means, which is connected to the receiving means, processes the program information, determines universal codes from the identification information, and determines, from the program information and by the use of the universal codes, the cost of airing the programs.

BRIEF DESCRIPTION OF THE DRAWINGS

These and other features and advantages will become more apparent from a detailed consideration of the invention when taken in conjunction with the drawing in which:

FIG. 3 is an example of a cross-code table which may be used by the computer of the commercial identification station shown in FIG. 1 in order to correlate the information received from each of the broadcast stations of FIG. 1;

DETAILED DESCRIPTION OF THE PREFERRED EMBODIMENT

Figure 1:
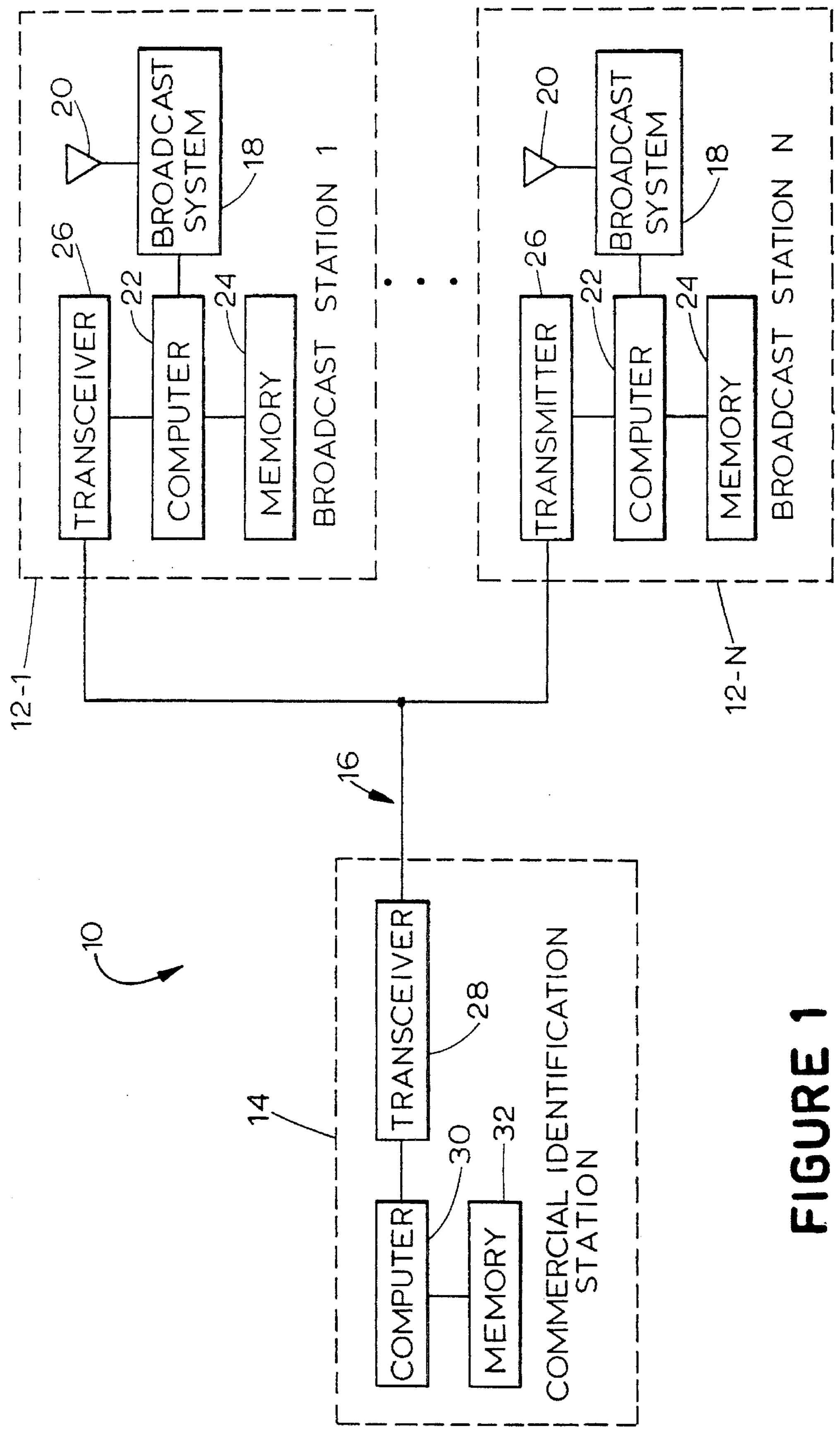
FIG. 1 illustrates a communication system according to the present invention.

As shown in FIG. 1, a commercial monitoring system 10 includes a plurality of broadcast stations 12-1 through 12-N which communicate with a commercial identification station 14 over a communication link 16. The communication link 16, for example, may be a public telephone system, a radio frequency link, a satellite link, or the like. The broadcast stations 12-1 through 12-N may be radio broadcast stations, television broadcast stations, or the like.

Each of the broadcast stations 12-1 through 12-N includes a broadcast system 18 for airing commercials. The broadcast system 18 may be a tape cartridge system, a broadcast relay system, or the like. The broadcast system 18 of each of the broadcast stations 12-1 through 12-N transmits its commercials over an antenna 20, and operates under the control of a computer 22.

The computer 22 operates at least partially in dependence upon traffic system information and accounting system information stored in a memory 24. In a tape cartridge based broadcast system, the traffic system information may include, for example, a schedule of programs and commercials by tape cartridge number and by other indicia in order to determine which, and when, such programs and commercials are to be aired by the broadcast system 18 over the antenna 20. The traffic system information may also include the date, time, and duration of each commercial aired by the associated broadcast station 12. Furthermore, the accounting system information stored in the memory 24 includes the cost of airing each commercial, and may include such other information as a description of the commercials aired by the associated broadcast station 12, an identification of the advertisers paying for the commercials aired by the associated broadcast station 12, the contract numbers under which the commercials are aired, and the identification of the associated broadcast station 12. Other information which may be stored in the memory 24 includes a commercial break number and sequence number for each commercial, an advertiser description describing the advertiser, a product brand code identifying the product brand of each commercial spot, a telecaster code for the commercial, and the station call letters of the broadcast station.

Accordingly, the memory 24 stores, and the computer 22 processes, both the traffic system information and the accounting system information of a broadcast station. Although both the traffic system and the accounting system of each of the broadcast stations 12-1 through 12-N have been represented by a single computer 22 and a single memory 24, it should be understood that the traffic system information and the accounting system information may be processed by more than one computer and stored in more than one memory. If so, the communication link 16 should be connected to as many of the broadcast station's computer systems as is necessary in order to retrieve the required competitive program and cost information.

The computer 22 of each of the broadcast stations 12-1 through 12-N is connected to a transceiver 26 which, under control of the computer 22, periodically transmits the corresponding broadcast station's traffic and accounting system information from the broadcast station 12 to the commercial identification station 14 over the communication link 16. Such traffic and accounting system information transmitted to the commercial identification station 14 may, at times, be referred to herein as commercial (or program) information. The commercial identification station 14 includes a transceiver 28 which receives the traffic and accounting system information transmitted by the transceiver 26 of each of the broadcast stations 12-1 through 12-N.

The transceiver 28 is connected to a computer 30 which, based upon program code stored in a memory 32, processes the traffic and accounting system information in order to identify the commercials aired by the broadcast stations 12-1 through 12-N, the cost of the commercials, and such other information as the date and time at which each commercial is broadcast. Based upon this information, the commercial identification station 14 can provide useful competitive information relating to which commercials were aired in which time slots, on which days, and for which durations. The commercial identification station 14 can also provide information relating to the amount of revenues expended by each advertiser and for each product brand, the time slots chosen by advertisers to advertise their product brands, and so on.

Periodically, such as either daily, weekly, or otherwise, traffic and accounting system information is transmitted by each of the broadcast stations 12-1 through 12-N to the commercial identification station 14. Each broadcast station 12 may transmit its traffic and accounting system information, for example, in response to an internal clock or in response to a polling request from the commercial identification station 14. When transmitting in response to an internal clock, each broadcast station 12 is assigned a unique time slot during which it self initiates the transmission of its traffic and accounting system information to the commercial identification station 14.

When transmitting in response to a polling request, each of the broadcast stations 12-1 through 12-N responds to a polling request. Thus, the transceiver 28 of the commercial identification station 14 may transmit a polling request message which is addressed to a first of the broadcast stations 12-1 through 12-N in order to retrieve the traffic and accounting information of this first broadcast station. When it has received all of the traffic and accounting information from the first broadcast station, the transceiver 28 of the commercial identification station 14 transmits a polling request message which is addressed to a second of the broadcast stations 12-1 through 12-N in order to retrieve the traffic and accounting information of this second broadcast station. Accordingly, the transceiver 28 transmits a polling request message which is addressed each of the broadcast stations 12-1 through 12-N, in turn, until the commercial identification station 14 retrieves all of the traffic and accounting information from all of the broadcast stations 12-1 through 12-N.

Alternatively, the transceiver 28 of the commercial identification station 14 may transmit a global polling request message to all of the broadcast stations 12-1 through 12-N. A global polling request message has a global address which encompasses all of the addresses of all of the broadcast stations 12-1 through 12-N. In response to this global polling request message, each of the broadcast stations 12-1 through 12-N transmits its traffic and accounting system information in turn according to a predetermined protocol.

Other transmission protocols are, of course, possible.

Figure 2:
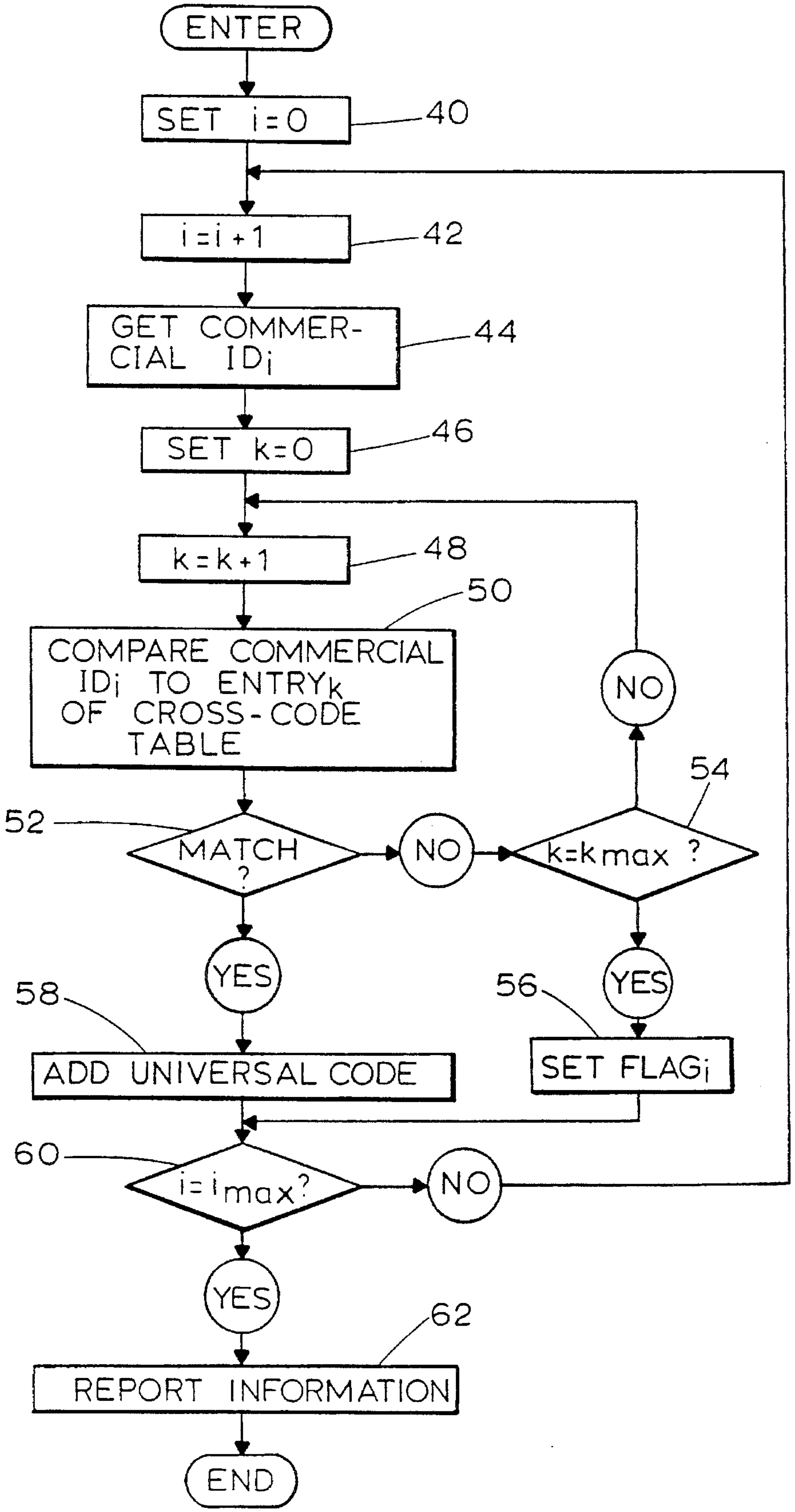
FIG. 2 is a flow chart relating to a program which may be executed by the computer of the commercial identification station of FIG. 1.

Once the commercial identification station 14 has received all of the traffic and accounting system information from each of the broadcast stations 12-1 through 12-N, the commercial identification station 14 processes this information according to a computer program, such as a computer program 38 represented by the flow chart shown in FIG. 2.

When the computer program 38 is entered, a block of code 40 sets a variable i to zero. A block 42 then increments the variable i by one, and a block 44 gets from the memory 32 the identification information contained in the commercial received with respect to a first commercial. Examples of the commercial information and the identification information which may be contained therein will be described more fully hereinafter in connection with FIGS. 3, 4, and 5. Identification information, for example, may include a description of the commercial, an advertiser code identifying the advertiser whose product is advertised in the commercial, a contract invoice number under which the commercial is aired, a tape cartridge number of a tape cartridge on which the commercial is stored by the broadcast station, and/or the like. The description of the commercial may instead be a code identifying the brand of the product identified in the commercial. This identification information may be referred to as a commercial identification code $ID_i$. Where i=1, the commercial identification code $ID_i$ i is the identification information of a first of the commercials to be identified and processed by the computer 30 of the commercial identification station 14.

After the block 44 gets the identification information of the first commercial, a block 46 sets a variable k to zero, and a block 48 increments the variable k by one. A block 50 then compares the commercial identification code $ID_i$ of the first commercial (i.e., where i=1) to a first entry (i.e., $ENTRY_k$ where k=1) of a cross-code table. The cross-code table is stored in the memory 32, and an example of this cross-code table is shown in FIG. 3 and will be discussed more fully hereinafter.

$ENTRY_k$ may be constructed similarly to the identification information received from the broadcast stations 12-1 through 12-N. That is, $ENTRY_k$ may include, for example, a description of a commercial, an advertiser code identifying the advertiser whose product is advertised in this commercial, a contract invoice number under which this commercial was previously aired, a tape cartridge number of a tape cartridge on which this commercial was stored by the broadcast station, and/or the like.

A block 52 determines whether or not the commercial identification code $ID_i$ of the first commercial matches this $ENTRY_k$ where k=1. If there is no match, a block 54 determines whether the variable k is equal to an upper limit $k_{max}$, which represents the total number of entries which are stored in the crosscode table. If the block 54 determines that k is equal to $k_{max}$ so that the commercial identification code $ID_i$ of the first commercial has been compared to all of the entries stored in the cross-code table, a block 56 sets a flag, $FLAG_i$. $FLAG_i$, where i=1, indicates that the first commercial does not have an entry in the cross-code table stored in the memory 32. Accordingly, the commercial identification code $ID_i$ related to the first commercial may be manually entered into the cross-code table stored in the memory 32. Consequently, this commercial identification code $ID_i$ becomes reference identification information which is used as an additional $ENTRY_k$ during subsequent passes through the program 38. Also included in each entry of the cross-code table is a universal code. Up to five unique universal codes may be assigned to each entry in the cross-code table. These five unique universal codes may be used to designate different themes of a commercial. However, five is an arbitrary number based on the assumption that an advertiser more than likely will not have more than five commercial themes running at the same time. This number, therefore, can be larger or smaller than five, as desired. In this manner, the cross-code table is manually assembled.

On the other hand, if the cross-code table has not yet been exhausted so that k is not equal to $k_{max}$, the block 48 increments k by 1, the block 50 compares the commercial identification code $ID_i$ of the first commercial (i.e., where i=1) to a second $ENTRY_k$(i.e., where k=2). If the block 52 detects a match between the commercial identification code $ID_i$ of the first commercial and $ENTRY_k$, a block 58 adds the universal code, which is stored in $ENTRY_k$ of the crosscode table, to the commercial information, which was received from the broadcast station 12 and which is stored in the memory 32, to form a record. This record includes, therefore, the commercial information and the universal code for the first commercial. Accordingly, this record may include, for example, the description of the first commercial, the code identifying the advertiser whose product is advertised in the first commercial, the contract number under which the first commercial was aired, the number of the tape cartridge on which the first commercial is stored, the code identifying the broadcast station 12 airing the first commercial, the cost of airing the first commercial, the date and time at which the first commercial was aired, the duration of the first commercial as aired, and the universal code for the first commercial. As will be apparent, this record may contain different or such other additional information as may be desirable.

After the block 56 sets the flag, $FLAG_i$, for the first commercial, or after the block 58 adds the relevant universal code to the stored commercial information of the first commercial and stores the result as a record, a block 60 determines whether the variable i is equal to $i_{max}$. That is, the block 60 determine whether all commercials have been compared to the entries in the cross-code table stored in the memory 32. If the variable i is not equal to $i_{max}$ at this point, the computer program 38 returns to the block 42 where the variable i is incremented by 1, and the next commercial (where i=2) is obtained from the memory 32 and is processed by the blocks 42–60.

When the block 60 determines that all commercials obtained from all broadcast stations 12-1 through 12-N have been processed, a block 62 reports the records stored in the memory 32 by the block 58. The reported records may take various forms. For example, reports can be generated which show the advertising revenues expended by each advertiser and/or for each brand, the advertising strategies implemented by advertisers for their brands, and the like. Other reports will occur to those skilled in the art.

An example of a cross-code table 70 is shown in FIG. 3. Each entry in the cross-code table 70 includes reference identification information (i.e., $ENTRY_k$) relating to a commercial which is to be identified. This information may be used to identify the advertiser and/or product brand corresponding to a commercial. Each product brand may have several entries. Each entry in the cross-code table 70 may include a description of a commercial to be identified, a code identifying the advertiser whose product is advertised in a corresponding commercial, a contract invoice number, a tape cartridge number of the tape cartridge containing the corresponding commercial, and a universal code which is used by the commercial identification station 14 to correlate the commercials aired by the broadcast stations 12-1 through 12-N so that meaningful information may be reported.

That is, since the broadcast stations 12-1 through 12-N may use different identification information to designate the same commercial, since the broadcast stations 12-1 through 12-N may use different identification information to designate the same advertiser, and/or since the broadcast stations 12-1 through 12-N may use different identification information to designate the same product brand, information concerning the commercials broadcast by these broadcast stations cannot be assembled into meaningful reports unless all of the different identification information can be correlated. A convenient way of correlating different identification information is to convert the different identification information into universal codes so that competitive information useful in assembling advertising reports may be more easily processed. The cross-code table 70, which stores universal codes for each advertiser, for each product brand, and/or for each commercial aired by each of the broadcast stations 12-1 through 12-N, is a convenient tool for making this conversion. Commercial information can then be sorted and assembled as a function of these universal codes so that meaningful competitive reports can be generated.

Accordingly, the cross-code table 70 is used to determine universal codes based upon the identification information (for example, the commercial description, the advertiser identification information, the contract invoice number, the tape cartridge number, and/or the like) transmitted by each of the broadcast stations 12-1 through 12-N so that the data stored in the memory 32 of the commercial identification station 14 can be better understood, managed, and analyzed.

The cross-code table 70 shown in FIG. 3 includes, by way of example, two entries for the same commercial. These entries represent the information which is used by two different broadcast stations to identify the same commercial. The first broadcast station describes the commercial as ABC, whereas the second broadcast station describes this same commercial as ABC/3546Z. The first broadcast station uses the code 0969 for the advertiser which is sponsoring this commercial, whereas the second broadcast station uses the code 82 for this same advertiser which is sponsoring this same commercial. The number of the contract under which the first broadcast station is airing this commercial is 1219, whereas the number of the contract under which the second broadcast station is airing this commercial is 13938. The number of the tape cartridge upon which the first broadcast station has stored this commercial is 958, whereas no tape cartridge number is available with respect to the second broadcast station.

As can be seen from the first four columns of FIG. 3, there is no information directly indicating that the two commercials represented in the cross-code table 70 are, in fact, the same commercial. Thus, when each of these broadcast stations airs this commercial and transmits their corresponding commercial information to the commercial identification station 14, the commercial information received from the two broadcast stations cannot be easily correlated in order to determine such useful competitive information as the total cost to the advertiser for airing this commercial by the two broadcast stations. However, because the cross-code table 70 stores the same universal code (i.e., 807555) for this commercial, the commercial information received from the two broadcast stations may be more easily correlated by use of these universal codes.

Figure 4:
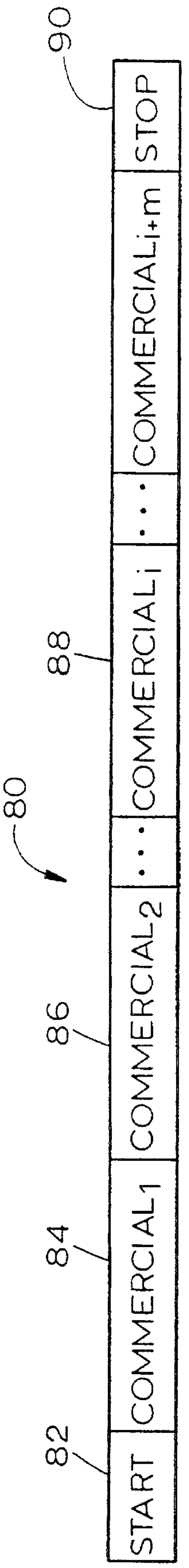
FIG. 4 illustrates an example of the commercial information transmitted from each of the broadcast stations to the commercial identification station of FIG. 1; and, FIG. 5 illustrates an example of a message format for each of the commercial information slots shown in FIG. 4.

A transmission 80 of commercial information transmitted by a broadcast station 12 to the commercial identification station 14 may take the form of FIG. 4. The transmission 80 includes a start segment 82. The start segment 82, for example, may include one or more synchronization bits designating the start of the transmission 80 which is transmitted from one of the broadcast stations 12-1 through 12-N to the commercial identification station 14. Following the start segment 82, the information related to each commercial aired by a broadcast station 12 is allotted a portion of the transmission 80. For example, information for commercial is contained in a commercial segment 84, information concerning $commercial_2$ is contained in a commercial segment 86, information concerning $commercial_i$ is contained in a commercial segment 88, and so on. Finally, the transmission 80 concludes with a stop segment 90 which may contain one or more bits to designate the end of the transmission 80.

Figure 5:
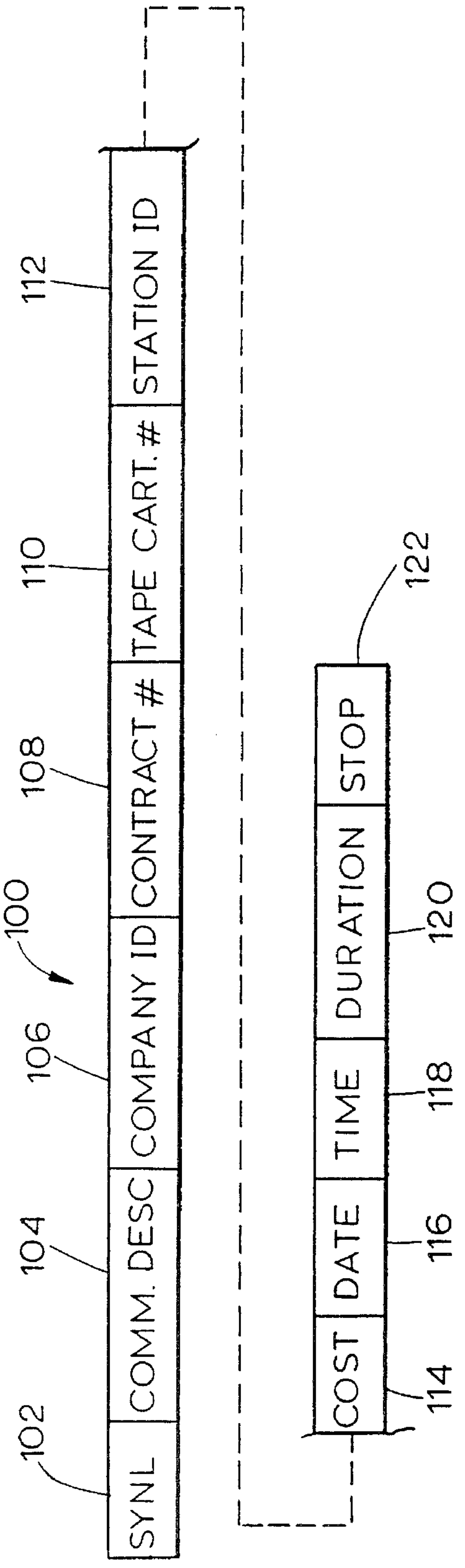

FIG. 5 shows the type of information which may be contained in each of the commercial segments 84, 86, 88 . . . shown in FIG. 4. As shown in FIG. 5, a commercial segment 100 includes a plurality of subsegments 102, 104, 106, 108, 110, 112, 114, 116, 118, 120, and 122. The subsegment 102 may include one or more synchronization bits which designate the start of information pertaining to a particular commercial. The subsegment 104 contains a description of the corresponding commercial. The subsegment 106 contains information designating the company/advertiser whose product is being advertised in the corresponding commercial. The subsegment 108 contains a contract number under which the corresponding commercial is aired. The subsegment 110 contains a tape cartridge number for the tape cartridge storing the corresponding commercial at the corresponding broadcast station 12. One or more of the subsegments 104, 106, 108, and 110 may comprise the identification information (i.e., the commercial identification code $ID_i$) which is compared by the block 50 with the corresponding column(s) of the entries in the cross-code table 70 in order to determine universal codes for the aired commercials.

The subsegment 112 contains information which designates the broadcast station 12 that aired the corresponding commercial. The subsegment 114 contains the cost incurred in broadcasting the corresponding commercial. The subsegment 116 contains the date on which the corresponding commercial was aired. The subsegment 118 contains the time at which the corresponding commercial was aired. The subsegment 120 contains the broadcast duration of the corresponding commercial. The subsegment 122 may include one or more stop bits which designate the end of the information pertaining to the corresponding commercial.

In addition, the commercial segment 100 may contain other information such as a product brand identification information, a telecaster code for the commercial, the regular program supported by the corresponding commercial, and a commercial break and sequence number for the corresponding commercial.

Certain modifications and alternative embodiments of the present invention were described above and others will be apparent to those skilled in the art in view of the foregoing description. Exclusive use of all such modifications and alternatives which come within the scope of the claims hereinafter is reserved.

I claim:

1. A program monitoring system for monitoring programs aired by a broadcast station, the program monitoring system comprising:

first processing means located at the broadcast station for processing program information concerning the programs aired by the broadcast station, wherein the program information includes information relating to a cost of airing each of the programs;

transmitting means located at the broadcast station and connected to the first processing means for transmitting the program information;

receiving means located remotely from the broadcast station for receiving the program information transmitted by the transmitting means;

second processing means connected to the receiving means for processing the program information, for identifying the programs from the program information, and for determining, from the program information, the cost of the programs aired by the broadcast station; and, a communication link between the transmitting means and the receiving means.

2. The program monitoring system of claim 1 wherein the program information contains identification information by which each program may be identified, wherein the second processing means includes a cross-code table, and wherein the second processing means determines universal codes for the programs based upon the identification information and the cross-code table.

3. The program monitoring system of claim 2 wherein the program information includes advertiser identification information identifying which advertisers paid for the programs, and wherein the second processing means also determines cost of air time by advertiser.

4. The program monitoring system of claim 3 wherein the second processing means determines, from the program information, a time and a date at which the programs were aired.

5. The program monitoring system of claim 4 wherein the second processing means flags programs which are not represented in the cross-code table.

6. The program monitoring system of claim 1 wherein the program information includes advertiser identification information identifying which advertisers paid for the programs, and wherein the second processing means also determines cost of air time by advertiser.

7. The program monitoring system of claim 6 wherein the second processing means determines, from the program information, a time and a date at which the programs were aired.

8. The program monitoring system of claim 7 wherein the second processing means flags programs which have not been previously identified by the processing means.

9. The program monitoring system of claim 1 wherein the second processing means determines, from the program information, a time and a date at which the programs were aired.

10. The program monitoring system of claim 1 wherein the second processing means flags programs which have not been previously identified by the processing means.

11. A system comprising:

a memory located at a broadcast station, wherein the memory stores program information concerning programs aired by the broadcast station;

a transmitter located at the broadcast station and connected to the memory, the transmitter being arranged to transmit the program information;

a receiver located remotely from the broadcast station, the receiver being arranged to receive the program information transmitted by the transmitter; and, a processor connected to the receiver, the processor being arranged to determine, from the program information, the identity of the programs aired by the broadcast station, and the cost of airing the programs aired by the broadcast station.

12. The system of claim 11 wherein the processor includes a cross-code table, and wherein the processor determines, based upon the cross-code table, universal codes relating to the programs aired by the broadcast station.

13. The system of claim 12 wherein the program information includes advertiser identification information identifying which advertisers paid for the programs, and wherein the processor also determines cost of air time by advertiser.

14. The system of claim 13 wherein the processor determines, from the program information, a time and a date at which the programs were aired.

15. The system of claim 14 wherein the processor flags programs which are not represented in the cross-code table.

16. The system of claim 11 wherein the program information includes advertiser identification information identifying which advertisers paid for the programs, and wherein the processor also determines cost of air time by advertiser.

17. The system of claim 16 wherein the processor determines, from the program information, a time and a date at which the programs were aired.

18. The system of claim 17 wherein the processor flags programs which have not been previously identified by the processor.

19. The system of claim 11 wherein the processor determines, from the program information, a time and a date at which the programs were aired.

20. The system of claim 11 wherein the processor flags programs which have not been previously identified by the processor.

21. An apparatus for monitoring programs aired by a plurality of broadcast stations, the apparatus comprising:

receiving means located remotely from the broadcast stations for receiving program information from the broadcast stations, wherein the program information includes identification information from which the identity of the programs aired by the broadcast stations may be determined, wherein the program information includes cost information relating to a cost of airing each of the programs, and wherein the identification information may be different between broadcast stations; and, processing means connected to the receiving means for processing the program information, for determining universal codes from the identification information, and for determining, from the program information and by the use of the universal codes, the cost of airing the programs.

22. The apparatus of claim 21 wherein identities of advertisers and/or descriptions of the programs may be determined from the identification information, wherein the processing means includes a cross-code table, and wherein the processing means determines the universal codes based upon the cross-code table and based upon the identities of the advertisers and/or the descriptions of the programs.

23. The apparatus of claim 22 wherein the processing means determines cost of air time by advertiser.

24. The apparatus of claim 23 wherein the processing means determines, from the program information, a time and a date at which each program was aired.

25. The apparatus of claim 24 wherein the processing means flags programs which are not represented in the cross-code table.

26. The apparatus of claim 21 wherein the processing means determines cost of air time by advertiser.

27. The apparatus of claim 26 wherein the processing means determines, from the program information, a time and a date at which each program was aired.

28. The apparatus of claim 27 wherein the processing means flags programs which have not been previously determined by the processing means.

29. The apparatus of claim 21 wherein the processing means determines, from the program information, a time and a date at which each program was aired.

30. The apparatus of claim 21 wherein the processing means flags programs which have not been previously determined by the processing means.

* * * * *